United States Patent [19]

Raby

[11] 4,004,434
[45] Jan. 25, 1977

[54] UNIVERSAL JOINT

[75] Inventor: Joseph M. Raby, Kettering, Ohio

[73] Assignee: Gardner-Denver Company, Dayton, Ohio

[22] Filed: Dec. 17, 1975

[21] Appl. No.: 641,543

[52] U.S. Cl. ................................. 64/17 R; 29/437; 403/154

[51] Int. Cl.² .......................................... F16D 3/26

[58] Field of Search ........... 64/17 R, 17 A; 29/437; 403/154, 316, 379

[56] References Cited

UNITED STATES PATENTS

| | | | |
|---|---|---|---|
| 1,798,890 | 3/1931 | Mayo et al. | 29/437 |
| 1,838,216 | 12/1931 | Dickey | 403/154 |
| 1,855,640 | 4/1932 | Lord | 64/17 R |
| 2,499,490 | 3/1950 | Good | 64/17 R |
| 2,844,949 | 7/1958 | Stillwagon, Jr. | 64/17 R |
| 3,447,232 | 6/1969 | Stillwagon, Jr. | 64/17 R |

Primary Examiner—Samuel Scott
Assistant Examiner—Randall Heald
Attorney, Agent, or Firm—Biebel, French & Nauman

[57] ABSTRACT

A low cost universal joint is disclosed, and the method for making the same, in which the smaller cross pin is transversely deformed in the region of intersection thereof with the main pin. In one embodiment, the transverse opening in the main pin is offset slightly from the center of the pin toward one end thereof, and pressing the main pin into a seated relation causes the slight deformation of the cross pin, thus capturing the pins in place. In another embodiment, the main pin is hollow, and the portion of the cross pin within the walls of the main pin is transversely deformed by inserting a punch through one end of the main pin and striking the exposed portion of the cross pin within the main pin, thus performing the transverse deformation and locking the pins in assembled relation within the universal joint.

4 Claims, 7 Drawing Figures

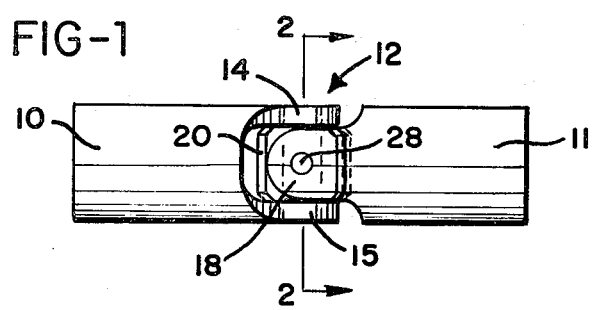
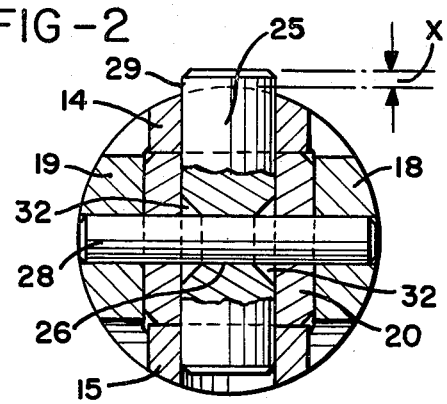
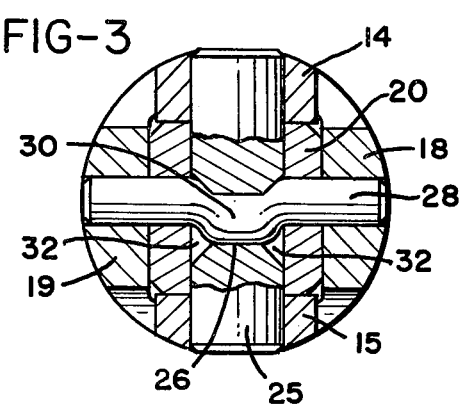
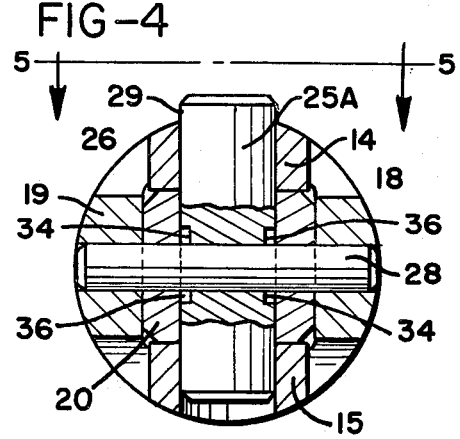
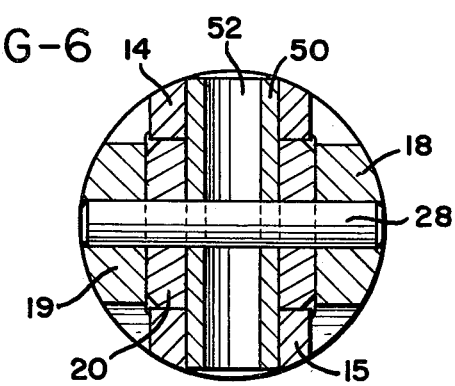
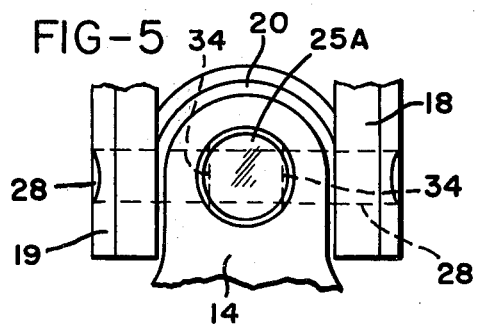
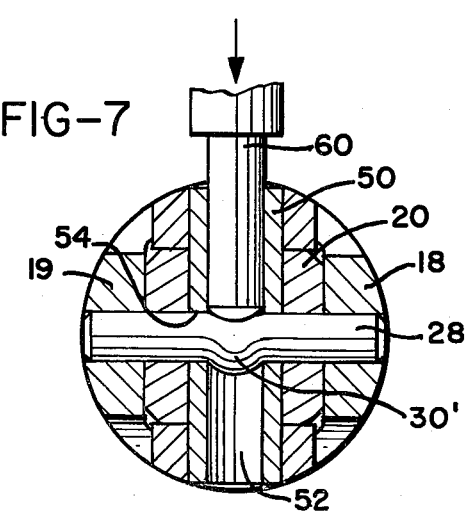

UNIVERSAL JOINT

BACKGROUND OF THE INVENTION

This invention pertains to universal joints and more particularly to low cost universal joints which couple together a pair of intersecting shaft portions or the like.

Universal joints commonly include a pair of intersecting pins which extend through aligned openings in the forks and in the block or cube. One common method of making such universal joints consists of the use of intersecting pins, one of which is larger in diameter than the other. The larger diameter pin, known as the main pin, extends between its forks with its extreme ends generally flush with the outer surfaces of the forks, and is provided with a central transverse opening therethrough. A second pin of smaller diameter, also known as a cross pin, extends at right angle through the opening in the main pin and through aligned openings in the other pair of forks. Such cross pin has commonly been fabricated to a length somewhat greater than the spaced apart distances of the forks through which it extends, so that a portion thereof protrudes above each of its forks. The exposed ends of the cross pins are then peened over and flattened to retain the cross pin in place. In U.S. Pat. Nos. 1,806,723 of 1931 and 2,153,415 of 1939, the cross pin is formed flush with the forks and is grooved to receive a snap ring or a keeper wire which locks the cross pin in place.

Such universal joints have an advantage of being relatively low in cost and easy to manufacture. However, they have certain distinct disadvantages. First, the cross pin has exposed heads on the surfaces of the forks which may be undesirable. Further, since the cross pin is captured at the forks, the relative rotation does not take place at the forks but rather takes place between the cross pin and the block at a region spaced substantially inwardly of the ends of the cross pin. When the universal joint is subjected to rotational torque, far greater unit bearing pressures are thus exerted on the cross pin, as compared to the main pin, because of the relatively shorter radius through which the bearing forces are transmitted. Since the cross pin is smaller, it is thus subject to earlier wear and failure.

Further, it has been common to provide an axial opening through the main pin leading to the region of intersection thereof to provide for access of lubricating fluids so that the cross pin and block may be lubricated. This increases the cost of the joint.

A further disadvantage results in the fact that the cross pin must be sufficiently malleable to be peened over, and something under 40 Rockwell C Scale is required. Even then substantial work hardening can result at the heads of the cross pin.

SUMMARY OF THE INVENTION

The present invention is directed to methods and apparatus providing relatively low cost universal joints which enjoy the benefit of those described above and which eliminate the disadvantages. I have found that if the cross pin is distorted at the region of pin intersection in a direction transverse to its length and offset to the axis of the main pin, the cross pin may thus be captured in place without further peening or other capturing measures. Such cross pins may be formed of relatively harder material, such as from 50-60 Rockwell C Scale and is thus less subject to wear. Since the cross pin is retained substantially at its axial center, it is free to rotate in its forks, thus substantially reducing the unit bearing pressures due to the increased radius at the region of the journal. The lubrication opening in the main pin can be eliminated and both pins can be made flush with the outer surfaces of their respective forks.

In one embodiment, the transverse deformation is accomplished by slightly offsetting the transverse hole through the main pin a short distance from the geometric center of this pin. Thus, when the two pins are assembled in position, the main pin will protrude or extend slightly above one of the outer surfaces of its forks. It may then be pressed or struck a blow, such to displace the main pin axially and thereby cause a corresponding displacement and deformation of the cross pin at the region of intersection thereof. The pins are now captured in assembled relation.

In another embodiment, a hollow main pin is employed. Such hollow pin or opening provides access for a punching tool which may be inserted through this opening and into engagement with the cross pin at the exposed central portion thereof within the walls of the main pin. A punch may then be employed to cause a transverse deformation at that region of the cross pin within the main pin, again capturing the pins in assembled relation.

It is accordingly an object of this invention to provide a universal joint and a method of making the same in which a cross pin of smaller diameter than a main pin is transversely deformed in the region of intersection of such pins to capture the cross pin within the universal joint.

A further object of this invention is the provision of a universal joint and method of making the same in which a main pin is provided with a transverse cross pin-receiving opening axially displaced a small distance from the geometric center of the main pin.

Another object of this invention is the provision of a universal joint and the method of making the same in which the intersecting portion of a smaller diameter cross pin is deformed by means of a punch extending through an access opening formed axially of the main pin.

These and other objects and advantages of the invention will be apparent from the following description, the accompanying drawings and the appended claims.

BRIEF DESCRIPTION OF THE DRAWINGS

FIG. 1 is an elevational view of a universal joint according to this invention;

FIG. 2 is an enlarged transverse section of a first embodiment taken generally along the line 2—2 of FIG. 1 showing the position of the parts prior to the seating of the main pin;

FIG. 3 is a cross sectional view similar to FIG. 2 of the completed universal joint of the first embodiment showing the main pin in its seated position;

FIG. 4 is a cross sectional view similar to FIG. 2, but showing the use of a slightly modified form of the main pin;

FIG. 5 is a fragmentary plan view looking generally along the line 5—5 of FIG. 4;

FIG. 6 is a sectional view of a second embodiment of the invention prior to the setting or deformation of the cross pin; and FIG. 7 illustrates the method and apparatus by which the cross pin arrangement of FIG. 6 is transversely deformed.

DETAILED DESCRIPTION OF PREFERRED EMBODIMENTS

Referring first to FIG. 1, a pair of generally cylindrical shaft sections 10 and 11 are joined at a universal joint indicated generally at 12. In the conventional construction of such joints, the shaft section 10 terminates in a pair of parallel spaced-apart jaws or forks 14 or 15 which define an open space therebetween. Also, conventionally, the forks 14 and 15 are provided with a pair of transversely aligned apertures or openings to receive a main pin therethrough, which is described in further detail below.

Similarly, the shaft section 11 is provided with a pair of parallel, spaced-apart and appertured forks 18 and 19, but only the adjacent fork 18 is seen in FIG. 1. The fork apertures are also transversely aligned to receive a smaller diameter cross pin, as described in greater detail below. Received within the box-like opening defined between the mutually interfitted jaws is a conventional cube bushing or block 20. The block 20 is conventionally formed with a pair of intersecting transverse openings which correspond in diameter and in alignment with the apertures formed in the respective pairs of forks 14, 15 and 18, 19.

The enlarged cross sectional views of FIGS. 2-5 may be considered as representing a first embodiment of the apparatus and method of the joint of this invention. Referring first to FIG. 2, a main pin 25 of relatively larger diameter is shown as extending between the forks 14 and 15 and through the block 20. The main pin 25 is formed with a transversely aligned aperture or opening 26 therethrough. The opening 26 is provided with a diameter sufficient to receive a cross pin 28 which also extends through the block and between the forks 18 and 19. The cross pin 28 is formed with a diameter which is approximately one-half that of the main pin 25.

In the embodiment of FIGS. 2-5, the opening 26 formed in the main pin 25 is axially offset from the center of the pin by a small distance X, as illustrated in FIG. 2, so that when the main pin and cross pins are assembled in their respective forks, a correspondingly small portion 29 of the main pin 25 extends above the fork 14, also as shown in FIG. 2. The overall length of the main pin 25 corresponds substantially to the spacing of the outer surfaces of the forks 14 and 15, while the length of the cross pin 28 similarly corresponds substantially to the spaced-apart distance of the outer surfaces of the forks 18 and 19. Where the shaft portions 10 and 11 are of the same diameter, the respective forks will have equal spacing, and the pin 25 and 28 will be of equal lengths.

In completing the assembly, the main pin 25 is displaced to a seated position in which its ends are substantially flush with the forks 14 and 15 by movement in a press or the like substantially through the distance X. This seated position is shown in FIG. 3 and results in a permanent deformation of the cross pin 28 in a direction along the axis of the main pin 25 in the region of the intersection of the pins. Such deformation is illustrated in somewhat exaggerated proportions by the transversely deformed central portion 30, as shown in FIG. 3. When the main pin 25 is seated and the cross pin 28 has thus been deformed, the cross pin is effectively captured between the forks 18 and 19 in the block 20, and since it extends through the opening 26, the main pin 25 is captured as well, and the assembly of the joint 12 is completed. In order to prevent excessive shearing forces on the pin 30, the opening 26 may be relieved or chamfered at the extreme ends thereof or, in other words, at the side walls of the pin, as illustrated by the relief regions 32 in FIG. 3.

The transverse maximum extent of permanent deformation of the portion 30 of the pin 28 should be sufficient to retain and capture the pin 28 and prevent axial displacement thereof within the universal joint. Such permanent deformation may be anywhere from a few thousands of an inch to approximately the diameter of the pin 28 itself or more, but preferably the extent of deformation should be held as small as feasible to capture the pin and prevent shearing of the pin or excessive work hardening. While it is preferred to provide some clearance as defined by the chamfers 32 or reliefs, such reliefs may be eliminated and the portion 30 of the pin 28 may be slightly offset from the main axis of the pin 28 in shear by reason of the pressing of the main pin 25 into the seated position in which it is flush with the outside surfaces of the forks 14 and 15.

When assembled as shown in FIG. 3, the main pin and the cross pin do not protrude substantially above their respective forks. The relative rotations of the small pin 28 as well as the large pin 25 are confined to its respective forks 18 and 19 and lubrication may be externally provided without the necessity for lubricating either of the pins at the block 20.

FIGS. 4 and 5 illustrate a slightly modified form of the main pin 25, as shown at 25a. The modified pin 25a is formed with a pair of generally parallel flats 34 at the sides thereof, providing slight clearance spaces 36 at the region where the pin 28 enters the main pin opening 26. The spaces 36 thus perform the same function as the chamfers 32 by providing a relief space to prevent undue stresses in shear in the pin 28 when the main pin 25 is pressed to its flush position through the distance X.

FIGS. 6 and 7 illustrate a modified form of the universal joint 12 and of the method of making the same. A hollow main pin 50 is employed which defines an axially extending opening 52 therethrough. A transverse opening 54 of a diameter to receive the pin 28 is formed through the pin 50 midway of the ends thereof, and a central portion of the pin 28 is now exposed to the opening 52 in the region between the walls of the pin 50. In order to provide the transverse deformation 30' (FIG. 7), a suitable punching member 60 is extended through the pin opening 52 and into contact with the pin 28 at the central region, and the pin 28 at this region is struck by the punch 60 to provide the slight transverse deformation 30' at the intersection of the pins, thus effectively capturing the pin 28 in assembled relation.

It will accordingly be seen that the present invention provides a novel method of making a universal joint in which a cross pin is transversely deformed in the region of intersection with a main pin, and this is accomplished either by displacement of the main pin in a direction along its axis in accordance with the embodiments of FIGS. 1-5 or by striking the cross pin with a punch means extended through an axial access opening in the main pin leading from the region of pin intersection to at least one end of the main pin. Preferably, however, in the embodiments of FIGS. 6 and 7, the main pin 50 is hollow throughout its length.

While the deformation of the pin 28 at 30 in FIG. 3 and at 30' in FIG. 7 is shown as extending across the diameter of the pin, it is within the scope of this invention to deform only an arcuate portion of the cross pin 28 in the central region thereof. Since this pin is normally provided with a close running fit within the main pin 25 and the block 20, in some instances only a slight burring or deformation of the cross pin in the intersection region is required for effectively capturing the cross pin in locked position. The slight burring or deformation may be considered as deforming the cross pin in a direction along the axis of the main pin in the region of intersection of these pins, as defined in the appended claims.

While the method and forms of apparatus herein described constitute preferred embodiments of this invention, it is to be understood that the invention is not limited to these precise methods and forms of apparatus, and that changes may be made therein without departing from the scope of the invention.

What is claimed is:

1. In a universal joint in which a pair of coupling members are arranged end-to-end and each having at one end a pair of forks in planes intersecting the planes of the forks of the other member with aligned openings therethrough, and a connecting block mounted between the forks of both pairs with intersecting bores in alignment with the fork openings, the improvement comprising a main pin extending transversely through an aligned pair of said fork openings and through said block bore and having a transversely formed generally central opening therein, said opening being axially offset from the geometric center of said pin, and a smaller cross pin received in right-angled relation to said main pin through the aligned fork pairs and through the intersecting opening of said block, said cross pin being deformed in a direction along the axis of the main pin in the region of the intersection of said pins to retain said cross pin in assembled position, the maximum extent of the transverse deformation of said cross pin at said main pin opening corresponding to the axial extent of said offset.

2. The joint of claim 2 in which said pins are captured at the intersection thereof, in which each of said pins is free to rotate in its respective forks, in which each of said pins has ends flush with the outer surfaces of said respective forks.

3. The universal joint of claim 1 further comprising means in said main pin defining a pair of relieved portions positioned in surrounding relation to said central opening to relieve undue stress at the regions where said cross pin enters said main pin.

4. The method of making a universal joint in which a pair of connecting members are each terminated in a pair of parallel apertured forks, and a block is fitted in the space between said forks and is provided with intersecting openings in alignment with said fork openings comprising the steps of inserting a main pin through one pair of said forks and said block, said main pin being provided with a transverse opening, inserting a cross pin through the other of said pairs of forks through said block and through said main pin opening, and transversely deforming said cross pin in the region of said main pin opening by displacing said main pin in a direction along its axis to deform said cross pin at the region of intersection thereof and thereby capture and retain said cross pin in assembled position.

* * * * *

UNITED STATES PATENT AND TRADEMARK OFFICE
CERTIFICATE OF CORRECTION

PATENT NO. : 4,004,434
DATED : January 25, 1977
INVENTOR(S) : Joseph M. Raby

It is certified that error appears in the above-identified patent and that said Letters Patent are hereby corrected as shown below:

Column 3, line 15, "appertured" should be -- apertured --.

Claim 2, line 1, "2" should be -- 1 --.

Signed and Sealed this

Twelfth Day of April 1977

[SEAL]

Attest:

RUTH C. MASON
*Attesting Officer*

C. MARSHALL DANN
*Commissioner of Patents and Trademarks*